US005205529A

United States Patent [19]

Killian

[11] Patent Number: 5,205,529
[45] Date of Patent: Apr. 27, 1993

[54] FRICTION-DAMPENED GUSSET

[75] Inventor: Michael L. Killian, Troy, Mich.

[73] Assignee: Eaton Corporation, Cleveland, Ohio

[21] Appl. No.: 739,890

[22] Filed: Aug. 2, 1991

[51] Int. Cl.⁵ .......................................... F16M 13/00
[52] U.S. Cl. .................................... 248/636; 248/638
[58] Field of Search ............... 248/674, 562, 568, 636, 248/638; 188/381, 268; 52/167

[56] References Cited

U.S. PATENT DOCUMENTS

| | | | |
|---|---|---|---|
| 1,508,346 | 9/1924 | Montgomery . | |
| 1,751,743 | 3/1930 | Link . | |
| 2,968,458 | 1/1961 | Moeller . | |
| 3,022,871 | 2/1962 | Saxe | 403/270 X |
| 3,429,600 | 2/1969 | Edie | 403/271 X |
| 3,874,710 | 4/1975 | Courtot | 403/271 X |
| 4,130,751 | 12/1978 | Gordon | 403/270 X |
| 4,133,157 | 1/1979 | Bschorr | 52/167 |
| 4,216,505 | 8/1980 | Grant | 248/636 X |
| 4,409,765 | 10/1983 | Pall . | |
| 4,480,731 | 11/1984 | Izeki | 248/636 X |
| 4,533,126 | 8/1985 | Mueller | 188/381 X |
| 4,545,466 | 10/1985 | Izeki | 188/268 |
| 4,615,157 | 10/1986 | Murray . | |
| 4,662,133 | 5/1987 | Kondo . | |

FOREIGN PATENT DOCUMENTS 0037339  3/1983  Japan .................................. 188/381

Primary Examiner—J. Franklin Foss
Attorney, Agent, or Firm—Watts, Hoffmann, Fisher & Heinke Co.,

[57] ABSTRACT

A bracket structure resistant to fatigue and a process of making same are shown. The structure can be useful for conveyances such as parts of automobiles; it comprises: a first and a second member joined together at a junction and extending out therefrom to form a gap between the resulting diverging surfaces; and a stressed gusset spanning the gap, the gusset having a first contact surface abutting said first member and second contact surface abutting said second member, the first contact surface being affixed to said first member, the second contact surface being in vibration-dampening frictional contact with said second member due to the stress on said gusset. Steel members and a steel gusset are preferred, together with a plug-welded connection of the first contact surface to the first member.

33 Claims, 4 Drawing Sheets

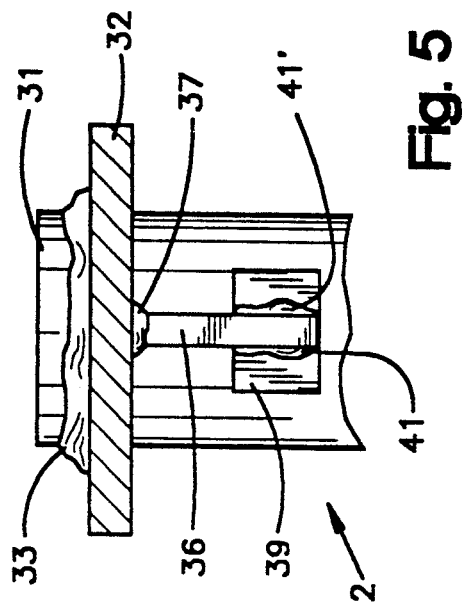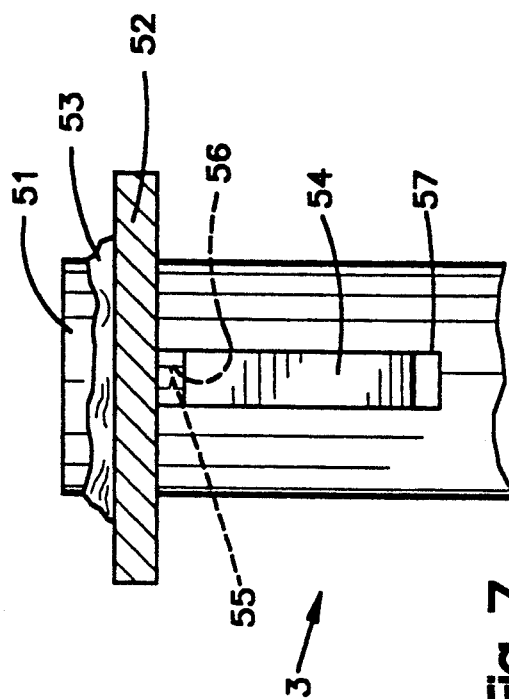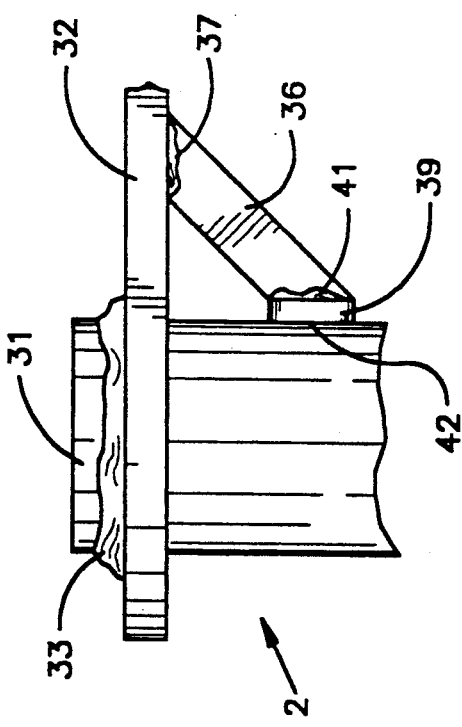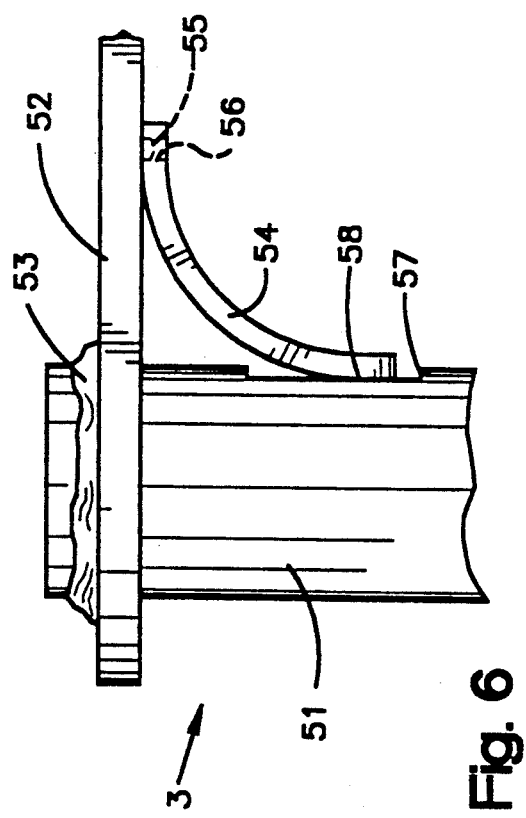

FRICTION-DAMPENED GUSSET

BACKGROUND OF THE INVENTION

1. Field of the Invention

This invention relates to a fatigue-resistant bracket structure, and more particularly to such structure braced with a friction-dampened gusset.

The instant invention is related to my copending U.S. patent application entitled *Plug-Welded Gusset*, Ser. No. 07/739,891, filed on Aug. 2, 1991. There, a footed gusset, preferably a strap that spans the joint and has feet bent from its ends for contacting the surfaces to be braced, is plug-welded to attach the gusset.

2. Description of the Prior Art

The conventional gusset for imparting fatigue resistance to an angular rigid joining of convergent surfaces is an "erect" or "plate-type" rigid gusset. For the usual right-angle, weldable, metal joint, such gusset typically is weldable metal triangle or a trapezoid that fills in all or almost all of a right angle at the joint; the legs of such triangle, or the slanting sides of such trapezoid, generally will be welded with fillet welds that box the outer ends and the long edges of the gusset which contact the metal surfaces being so braced.

The prior art appears to be devoid of suggesting the use of a friction-dampened gusset for rendering a bracket structure of a conveyance resistant to failure from fatigue. Such a bracket may be, for example, a hanger bracket for an air chamber of an automotive truck. In conveyances a bracket structure is likely to be subject to extended periods of vibration. Conveyances here include vehicles generally such as autos, trains, wagons and cycles, and they also include ships, aircraft and spacecraft.

Heretofore, shock-arresting frictional snubbers in the form of plates sliding in slots have been proposed for an automobile chassis (U.S. Pat. No. 1,508,346) and for engine mountings (U.S. Pat. No. 1,751,743), both to obtain a smoother ride.

Also, for arresting occasional explosive or seismic shocks in ships and in buildings, there have been proposed various other friction-dampened connections. These are shown in U.S. Pat. Nos. 2,968,458, 4,409,765 and 4,615,157.

A rigid bracket structure, apart from any gusset, may be basically a bent piece of stiff material such as a piece of flat, weldable metal. More frequently, however, the structural portions being braced are two intersecting members joined by welding such as fillet welding. Frequently, the elements of a bracket will comprise a ferrous metal such as steel, and most of the intersections or bends so braced will project from each other at substantially a right angle. The ordinary fillet weld is a weld of approximately triangular cross section joining two surfaces at right angles to each other in a lap joint, T-joint, or corner joint. However, in this application, the intersection of the two surfaces also may form an acute or obtuse angle instead, and the intersection may define a straight or curved line that may be in a single plane or in more than one plane.

The instant invention has been found to be surprisingly effective for prolonging the fatigue life of a bracket. The fatigue life of welded brackets for automotive use, when made in accordance with the principles of this invention, may be easily 25-300 times longer than the fatigue life of conventional brackets now made for the same purposes.

Additionally, the installation of the instant friction-dampened gusset can be simple and quick, and the resulting inventive bracket can provide consistently high fatigue-resisting performance that is particularly advantageous for mass production of the item.

SUMMARY OF THE INVENTION

One aspect of the invention is a bracket structure resistant to fatigue; it comprises:

a first member and a second member connected at a junction, each of said members extending outward from the junction to establish an angular gap between them; and a gusset spanning said gap, the gusset having a spanning portion, a first contact surface bearing on said first member, thereby forming a first interface therebetween, and a second contact surface bearing on said second member, thereby forming a second interface therebetween, the first contact surface being affixed at the first interface to said first member, the second contact surface being in frictional contact with said second member at the second interface, and a bending stress on the spanning portion of the gusset forcing said frictional contact between said second contact surface and said second member.

Another aspect of the invention is a process for imparting fatigue resistance to a bracket structure that includes a first member connected at a junction to a second member diverging from the first member to form a gap therebetween. The improvement comprises:

disposing a gusset across said gap, the gusset having a spanning portion, a first contact surface bearing on said first member, thereby forming a first interface, and a second contact surface for abutting said second member thereby forming a second interface;

affixing said first contact surface to said first member at the first interface; and imparting a bending stress to the spanning portion of the gusset sufficient to deflect it within its elastic limit, thereby forcing frictional contact between said second contact surface and said second member.

The foregoing bending stress can be imparted to the spanning portion of the gusset prior to or after the first contact surface is affixed to the first member at the first interface; these alternatives will be described in detail in connection with the description of preferred embodiments.

BRIEF DESCRIPTION OF THE DRAWINGS

FIG. 4 is a fragmentary side elevation of a footed gusset in a bracket structure related generally to the structure of FIG. 1;

FIG. 5 is a fragmentary front elevation view of the structure of FIG. 5;

FIG. 6 is a fragmentary side elevation of an arcuate gusset in a bracket structure related generally to the structure shown in FIG. 1;

FIG. 7 is a fragmentary front elevation view of the structure of FIG. 7;

DESCRIPTION OF THE PREFERRED EMBODIMENTS

Figure 1:
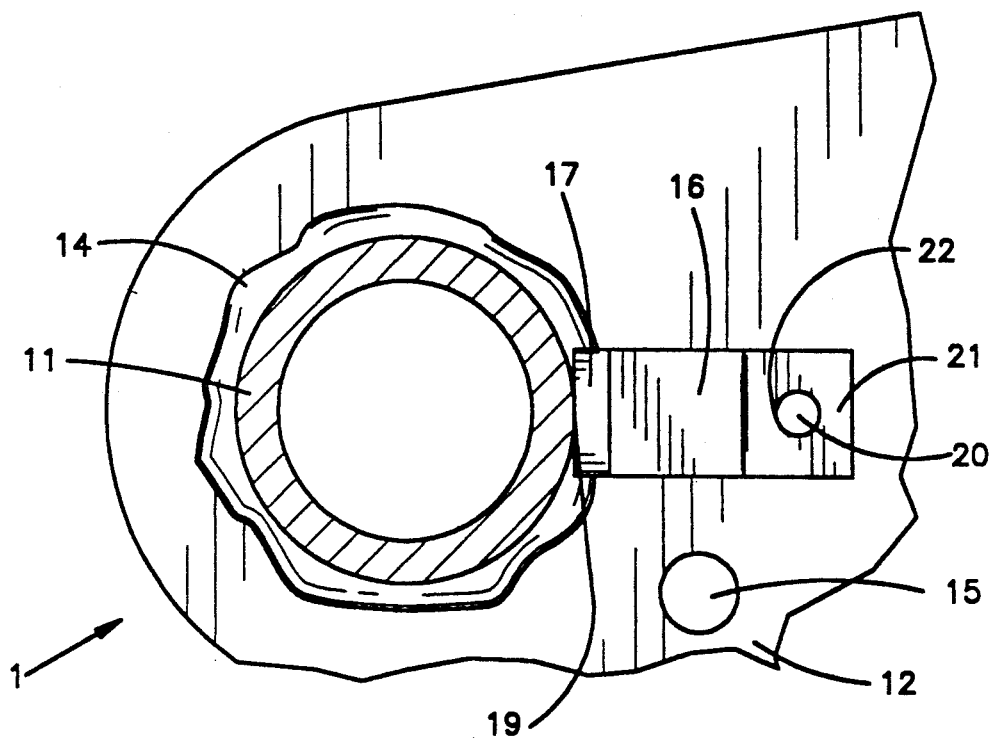
FIG. 1 is a fragmentary top plan view of an air chamber bracket intended for heavy-duty truck brake applications.
Figure 2:
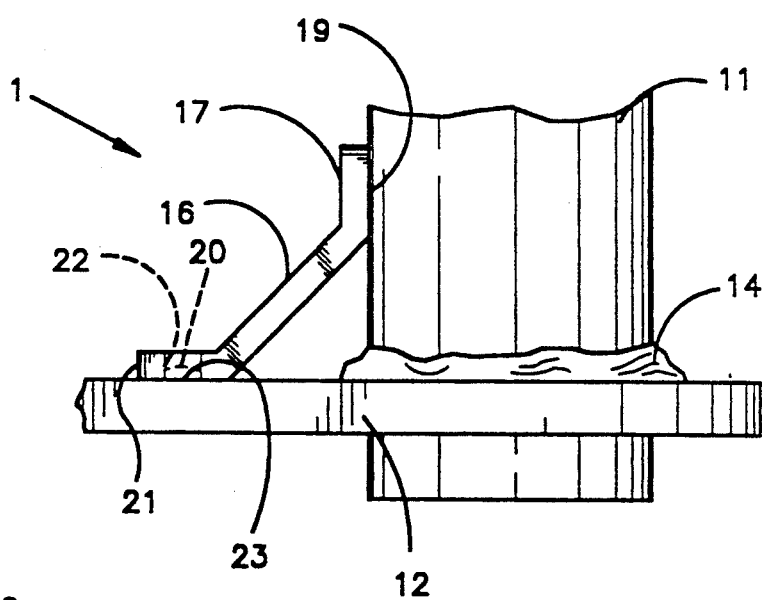
FIG. 2 is a fragmentary side elevation of the bracket of FIG. 1.
Figure 3:
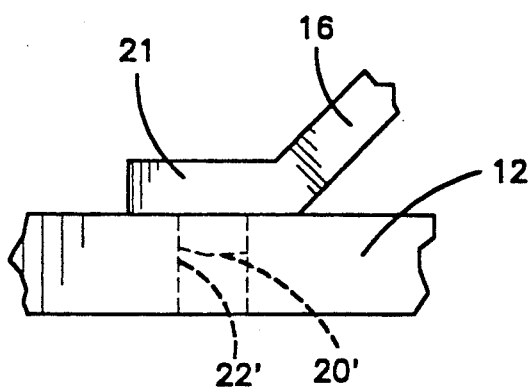
FIG. 3 is an enlarged side elevation view of an alternative imperforate foot connection for the gusset of FIG. 2.

Reference is made to the drawings, specifically to FIGS. 1, 2 and 3 showing the air chamber bracket structure designated generally by arrow 1. The structural members of the bracket include mild steel barrel 11 (grade SAE 1018) is fillet-welded with bead 14 to a mold steel barrel 12 (same grade of steel) to form a right-angle joint between the arm and the barrel. The arm 12 is 7/16 inch thick, and the barrel 11 is ¼ inch thick and about 7.4 inches in circumference. The low carbon steel stamping 16 is a friction-dampened strap gusset one inch wide and 5/16 inch thick. It is welded by a plug weld 20 that goes through hole 22 in bent foot 21 and affixes that foot 21 to the arm 12. The other end of gusset 16 spanning the joint is foot 17; that foot presses hard against the barrel 11 at interface 19, but it is not attached. The spanning portion of the gusset 16 extends between the feet 17 and 21. An alternative plug welding is shown in FIG. 3 wherein the weld hold 22' for the plug weld 20' goes through arm 12 instead of the foot 21. The plug welding may be done with an 0.045 inch diameter low carbon steel wire (Specification AWS A5.18-79, E70S-6) using gas metal arc welding.

A preferred way of emplacing and stressing the gusset 16 is to clamp temporarily the welded-together barrel 11 and arm 12 assembly in rigid tooling (not shown) to hold these members in place without deflection, then force the gusset 16 into contact at its ends 17 and 21 with barrel 11 and arm 12, respectively. A hydraulic jack means (not shown) pressing against the span of gusset 16 may be used to effect this forcing, and the slight deforming of the spanning portion of the gusset inwardly towards the joint can include a plastic deformation or be only within the elastic limits of the gusset metal. Then, the plug weld 20 is made through hole 22. The weld 20 is allowed to harden, then the hydraulic jack means pressure on the gusset 16 is released. This is a prestressing operation on the gusset, and the release of the jack pressure causes the gusset 16 to force its upper foot 17 against the barrel 11 for friction-dampening the motion of foot 17 on the barrel 11. The prestressing precedes the attachment of foot 21 to arm 12 (by the plug welding), and it is a preferred technique when it can be used. The plug weld 20 preferably is made by gas metal arc welding (GMAW).

An alternative way of emplacing a gusset such as the gusset 16 in bracket 1 is to deflect, within or beyond their elastic limits, the arm 12 and/or the barrel 11 to widen the gap between them with pressure from a hydraulic jack (not shown), thus slightly widening the gap for the gusset to span, then to affix the gusset 16 to the arm 12 or the barrel 11 with a plug weld. In such instance, the use of a plug weld 20' coming through the arm 12, as is FIG. 3, with GMAW welding is a good practice. Releasing the external load (the jack) after the weld has hardened causes the arm 12 and/or barrel 11 of the bracket assembly to try to spring back to a rest position. The spanning portion of the gusset resists this effort, and thus it is given a bending stress. The result is friction between upper foot 17 and barrel 11 at interface 19 and dampening of foot 17 motion on said barrel.

During fatigue testing relative movement occurs between gusset foot 17 and the barrel 12. Because of the stressing of the gusset by either method described above, a motion-dampening frictional force is developed at the interface of foot 17 and barrel 12; it resists the relative motion of these parts, dissipates energy, and dampens much of the mechanical vibration from fatigue loading of the bracket.

Ungusseted standard production air chamber brackets and rigidly gusseted air chamber brackets of the same size and for the same service as the bracket 1 typically exhibit accelerometer-measured loads at the air chamber that are from about 1.5 to more than 2.6 times greater than those exhibited by like use of the bracket 1. This results in greatly improved fatigue performance by the bracket 1.

An air chamber (not shown) which the bracket 1 is designed to carry may be bolted to the arm 12 to provide an actual cantilevered loading on the fillet-welded joint made with bead 14. The bracket 1 then may be subjected to an accelerated fatigue test at its resonant vibrational frequency. The weld 14 is deemed to have failed when a 1-inch long crack in the weld or along one of its feet can be seen to open and close (a "breathing crack") as viewed with the naked eye under stroboscopic illumination. Failure by fatigue cracking of the weld 14 may occur after more than a million cycles. This compares extremely favorably with a like test on a standard production air chamber bracket of the same size that is ungusseted; its fatigue life of such standard gusset (when the foregoing crack failure occurs) can be as low as 3,000–20,000 cycles; the fatigue life of rigidly-gusseted brackets of the same size is considered quite satisfactory at 50,000 cycles.

A plug weld is a weld deposit of filler metal inside a hole that goes clear through one weldable metal piece and abuts another weldable metal piece. The weld connects the two pieces. The cross section of such hole usually is circular, but it can be oval, square or of other shape. Such welds often substantially fill the weld hole, but need not do so to be effective; a weld bead around the inner periphery at the base of the weld hole in one piece of metal where it abuts the other can be quite effective for most of the instant structures. More than one weld hole with a plug weld can be used at a particular fastening area.

Referring now to FIGS. 4 and 5, the bracket assembly, as at 2, is formed from the steel barrel 31 fillet welded by weld 32 to steel arm 32. Steel gusset 36 is basically a plate-type (erect) gusset about 5/16 inch thick with a friction foot 39. Gusset 36 is welded to the arm 32 by fillet (boxing) weld 37. The spanning portion of gusset 36 extends down to foot 39, and it is welded to said foot 39 by welds 41 and 41'. The interface 42 between the foot 39 and barrel 31 is a strictly frictional contact; the foot 39 or barrel 31 may be coated with a friction-developer such as molybdenum metal, if desired, for increasing the friction between items 31 and 39. While the contact surface of foot 39 at the interface 42 is shown as being substantially flat, it can be conformed to the curvature of barrel 31, if desired, for greater frictional force development. The gusset 36 is stressed by emplacing and stressing it in accordance with the alternative way described above in connection with gusset the 16 of the bracket 1, except that the boxing fillet weld 37 is used instead of a plug weld at the upper end of the gusset 36 to attach the erect gusset 36 to arm 32.

Referring now to FIGS. 6 and 7, arrow 3 indicates generally a steel bracket made with barrel 51 welded to arm 52 by fillet weld 53. Gusset 54 is a spring steel piece affixed to arm 52 by a plug weld 55 through hole 56. If desired, the plug weld could be going through a hole (not shown) in arm 52 instead of the hole 56 in the gusset. In that way the plug weld could be made larger in diameter. The gusset 54 is stressed strongly against its interface 58 with the flattened area 57 cut into the wall of barrel 51. If desired, also, the flattened are 57 may have a bit of depth (e.g., 1/16 inch) so as to have slight side walls (not shown), for guiding the reciprocating motion of the lower end of gusset 54 with respect to the barrel 51 and keep such motion axial with respect to barrel 51.

Figure 8:
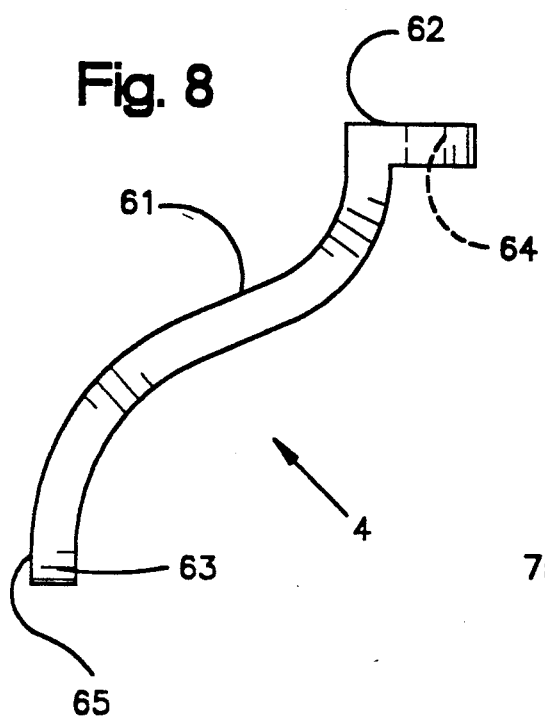
FIGS. 8 and 9 are profiles of two suitable footed gusset types for use in the instant invention.

Referring now to FIG. 8, the steel gusset 61 is a 1-inch wide strap shown in profile and referred to by an arrow 4. The foot 62 at the top has hole 64 for plug-welding attachment to a structural member of a bracket (not shown). The lower end 63 is curved for spring-loading its surface 65 against another structural member of the bracket (not shown) whose vibrations are to be dampened.

Figure 9:
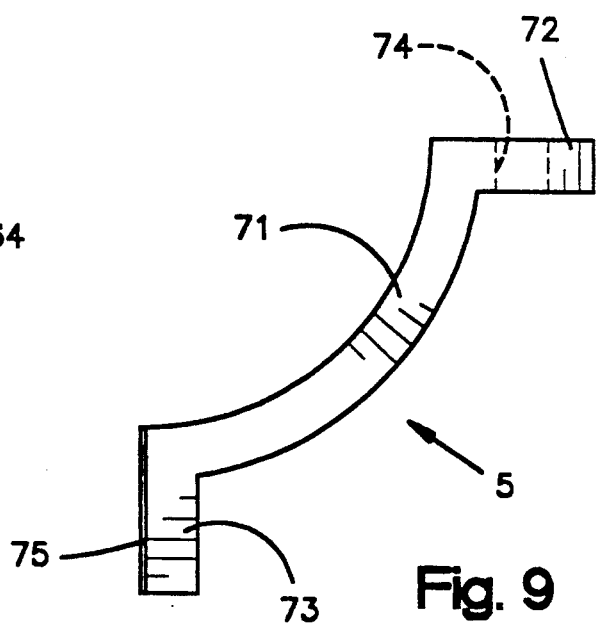

Referring now to FIG. 9, the steel gusset 71 is a 1-inch wide strap shown in profile and denoted by an arrow 5. The upper foot 72 is equipped with weld hole 64; the lower foot 73 has molybdenum metal plating 75 on it. The gusset 5 can be attached at its top to span the gap of a bracket (not shown) and prestressed before attachment to a structural member of a bracket (not shown).

Figure 10:
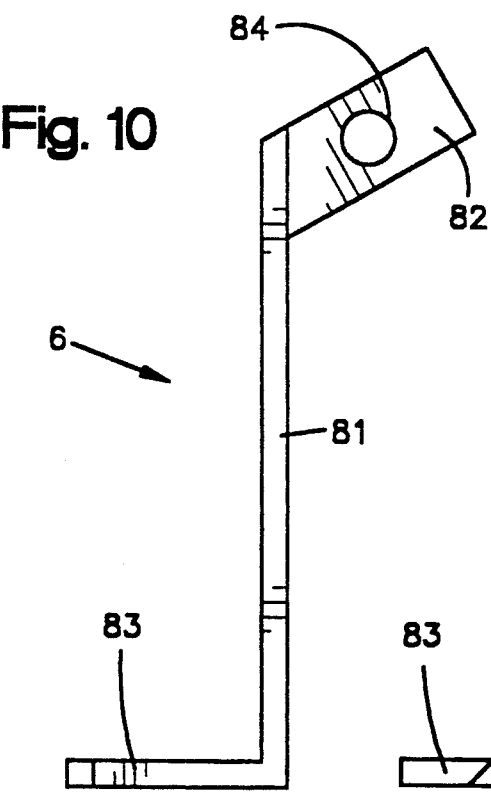
FIG. 10 shows the front elevation view of and FIG. 11 the side elevation view of a strap gusset with bent ends, the gusset being suitable for use in the instant invention.
Figure 11:
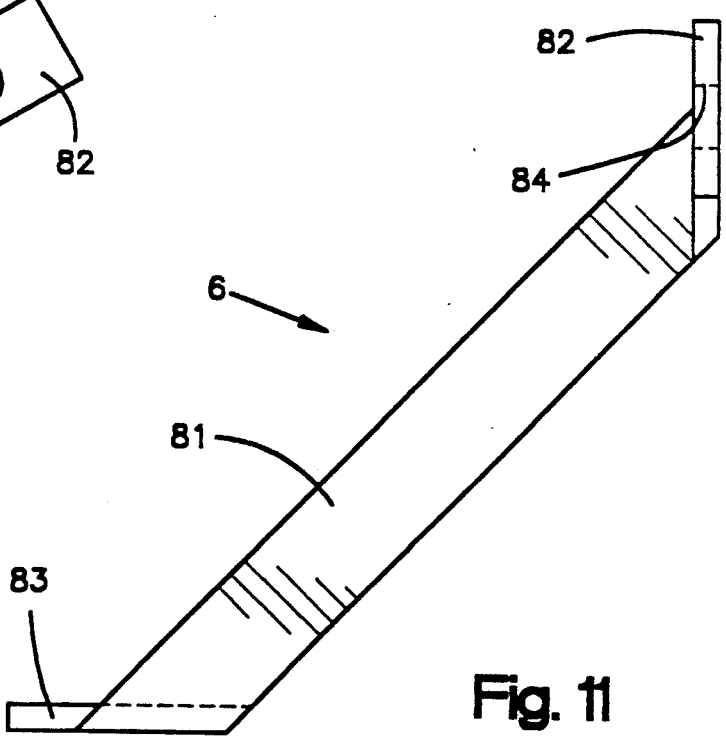

Referring now to FIGS. 10 and 11, the 1-inch wide footed steel strap gusset is denoted by arrow 6. Bent ends 82 and 83 are the feet terminating the gusset shank (spanning portion) 81. The upper foot 82 is equipped with a weld hole 84 for plug welding to one member of a bracket (not shown). The lower foot 83 being flat for frictional contact with another member of such bracket. The gusset is adapted for prestressing as though it were a substantially triangular erect or plate-type gusset, except that a plug weld can be used to affix it to a structural member of a bracket instead of using a fillet weld. The gusset to be stressed transversely to spanning portion 81 after it has been affixed to a structural member of a bracket in the alternative manner described in connection with bracket 1 of FIGS. 1 and 2.

Figure 12:
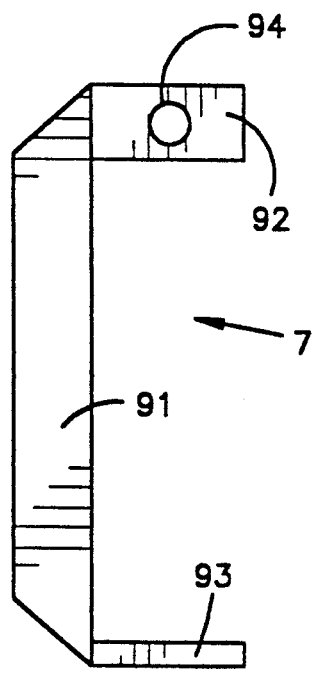
FIG. 12 shows the front elevation view of and FIG. 13 the side elevation view of an alternative strap gusset with bent ends, the gusset being suitable for use in the instant invention.
Figure 13:
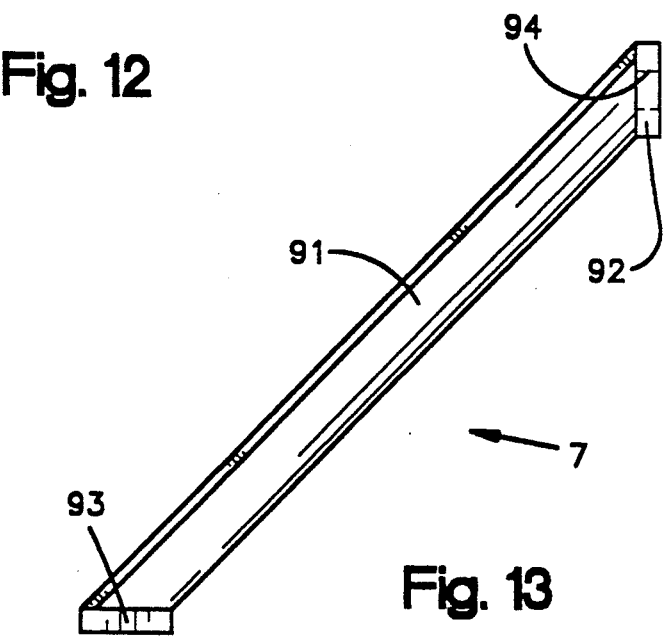

Referring now to FIGS. 12 and 13, arrow 7 refers to a steel strap gusset having shank 91 terminated with upper attaching foot 92 and lower friction foot 93 having weld hole 94. The gusset 7 may be used like the gusset 6 of FIGS. 10 and 11.

Figure 14:
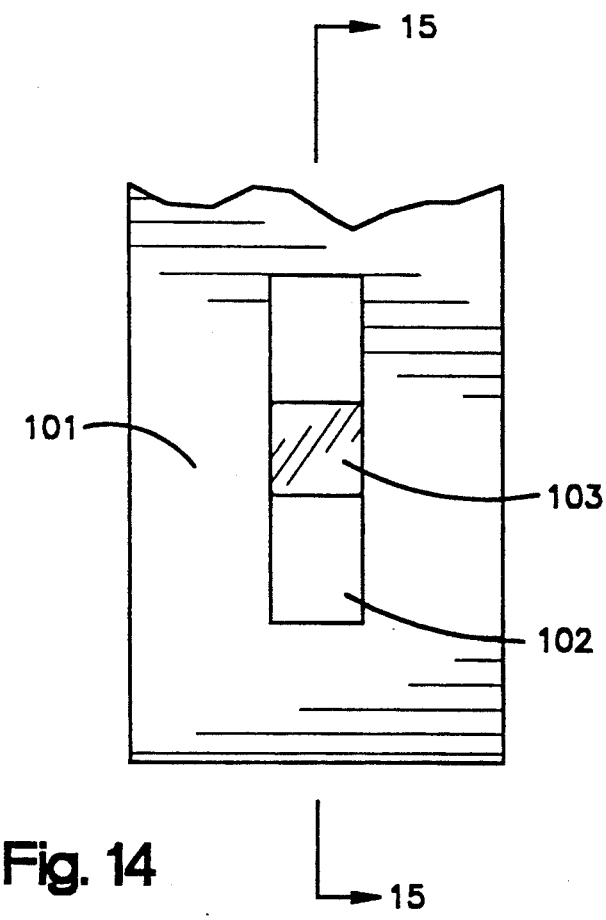
FIG. 14 shows the fragmentary front elevation view of and FIG. 15 the fragmentary side elevation view of the foot portion of another alternative strap gusset for use in the invention, the gusset being equipped with guide means for directing reciprocatory motion of the second contact surface at the second interface.
Figure 15:
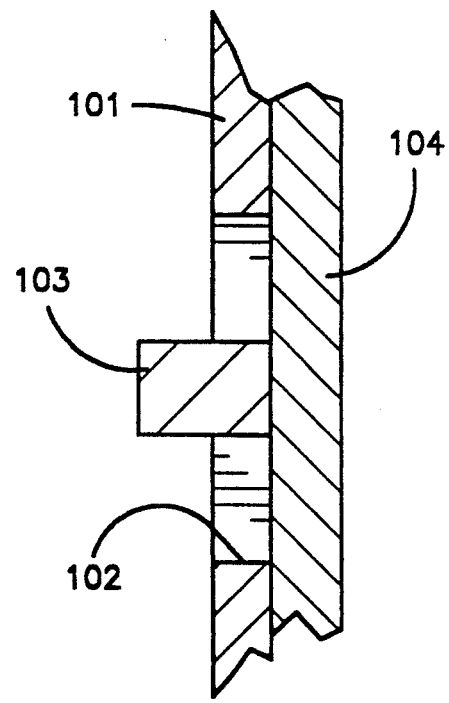

Referring now to FIG. 14, foot 101 of a steel strap gusset 7 exerts spring pressure against structural member 104 of a bracket. The post 103 of square cross section projects from the member 104 and passes through a slot 102 in the foot 101. Said post can serve as a guide for the reciprocating motion of the foot 101 against the member 104. Friction of the sides of the slot 102 on post 103 also can help to snub that motion somewhat (in addition to the snubbing done by the broad interfacial frictional contact of the foot 101 against the member 104).

The various useful metal welding processes for the plug welds include: gas metal arc welding (GMAW, the first choice); gas tungsten arc welding (GTAW, the second choice); plasma ar welding (PAW); shielded metal arc welding (SMAW); plasma transferred arc welding; and submerged arc welding. Other suitable welding processes include laser beam welding and electron beam welding. The preferred ones lend themselves to especially good control of the energy input to and the weld size of the plug weld. Oxyfuel welds could be used, but generally are through too slow to be truly practical.

The preferred way for affixing a weldable first contact surface of the gusset to a weldable first member of a bracket here is by welding, especially by plug welding where possible, for efficiency and economy. Welding makes the resulting attached parts integral and not likely to slip relative to each other. However, other methods of making such attachment can be used in addition to as an alternative to welding; such methods include bolting, using rivets, and/or even using an adhesive fastening in some cases. When affixing the gusset by other than welding it to a member, neither the gusset nor that part of the member interfacing with the gusset for affixing needs to be of weldable material or even a metal; when affixing the gusset by other than welding it to a member, neither the gusset nor that member part interfacing with it for affixing need comprise a weldable material or even metal; the material construction then may comprise polymer, particularly a polymer reenforced with glass fiber or other fiber, and/or a bonded fiber, and in general, stiff structural materials that are not brittle, but rather are those having sufficient tensile strength and elasticity to permit their essentially elastic flexure and response during periods of vibration of one or both structural members of the resulting bracket structure.

Unless expressly stated otherwise herein, the welding terms used herein are those defined by the American Welding Society in its 1985 publication ANSI/AWS-A3.0-85 entitled "Standard Welding Terms and Definitions." The principle and preferred metals here are ferrous, e.g., mild steel and stainless steels. Other weldable metals include nickel, cobalt, aluminum, titanium, magnesium, copper and some bronzes.

Many other modifications and variations of the invention will be apparent to those skilled in the art in the light of the foregoing disclosure and drawings. Therefore, it is to be understood that, within the scope of the appended claims, the invention can be practiced otherwise than has been specifically shown and described.

I claim:

1. A bracket structure resistant to fatigue comprising:
   a first member and a second member connected at a junction, each of said members extending outward from the junction to establish an angular gap between them; and
   a gusset spanning the gap,
   the gusset having a spanning portion, a first contact surface bearing on said first member, thereby forming a first interface therebetween, and a second contact surface bearing on said second member, thereby forming a second interface therebetween, the first contact surface being affixed at the first interface to said first member, the second contact surface being in frictional contact with said second member at the second interface, and a bending stress on the spanning portion of the gusset forcing said frictional contact between said second contact surface and said second member.

2. The structure of claim 1 wherein the junction is a fillet-welded joint, and the gusset is a footed gusset.

3. The structure of claim 1 wherein the junction is a fillet-welded joint, and the gusset is an erect gusset.

4. The structure of claim 1 wherein the junction is a fillet-welded joint, and there is a guide means for directing motion of said second contact surface at said second interface.

5. The structure of claim 4 wherein the guide means includes a pin projecting from the surface of said second member and extending through a slot in said second contact surface.

6. The structure of claim 1 wherein the junction is a fillet-welded joint, and first contact surface and the surface of said first member at said first interface are of metal adapted to be welded together, and said first contact surface is affixed to said first member by weld means.

7. The structure of claim 6 wherein said first contact surface and the surface of said first member at said first interface are comprised of ferrous metal.

8. The structure of claim 7 wherein the weld is a gas metal arc weld, and the first member, the second member and the gusset comprise steel.

9. The structure of claim 8 wherein the gusset is a footed gusset, and the weld means includes at least one plug weld extending through a hole formed in the first contact surface at said first interface.

10. The structure of claim 9 wherein the gusset is a footed gusset, and the weld means includes at least one plug weld extending through a hole formed in the first member at said first interface.

11. The structure of claim 1 wherein a friction-increasing material is disposed at the second interface.

12. A bracket for a conveyance, said bracket comprising the structure of claim 1.

13. The bracket of claim 12 wherein the conveyance is an automobile, and the bracket is an air chamber bracket.

14. A bracket structure resistant to fatigue comprising:

a first metal member and a second metal member joined at a welded junction therebetween and extending outward from said junction to establish an angular gap between them;

a gusset spanning the gap, the gusset being weldable to said first member, having a spanning portion, a first contact surface bearing on said first member, forming a first interface therebetween, and a second contact surface bearing on said second member, forming a second interface therebetween, the first contact surface being affixed at said first interface to said first member by a weld means, the second contact surface making frictional contact with said second member at the second interface, and a bending stress on the spanning portion of the gusset forcing said frictional contact between said second contact surface and said second member.

15. The structure of claim 14 wherein the first member, the second member and the gusset comprise steel, and the gusset is a two-footed gusset, one foot of the gusset being affixed by welding to said first contact surface.

16. The structure of claim 15 wherein the welding is provided by at least one plug weld, said plug weld being a gas metal arc weld.

17. The structure of claim 16 wherein the plug weld is substantially circular in cross-section.

18. The structure of claim 14 which is a part for a conveyance.

19. The structure of claim 18 which the first and the second members are parts of a bracket for automotive use.

20. The structure of claim 1 wherein the spanning portion of the gusset is arcuate.

21. The structure of claim 1 wherein the spanning portion of the gusset is substantially straight.

22. In a process for imparting fatigue resistance to a bracket structure that includes a first member connected at a junction to a second member that diverges from the first member to form a gap therebetween, the improvement comprising:

disposing a gusset across said gap, the gusset having a spanning portion, a first contact surface bearing on said first member, thereby forming a first interface, and a second contact surface bearing on said second member, thereby forming a second interface, imparting a bending stress to the spanning portion of the gusset which can force frictional contact between said second contact surface and said second member, and affixing said first contact surface to the first member at the first interface.

23. The process of claim 22 wherein a bending stress is imparted to the spanning portion of the gusset prior to affixing said first contact surface to said first member at the first interface.

24. The process of claim 22 wherein the spanning portion of the gusset is stressed by forcing deflection of at least one of the joined members in the direction of widening said gap before affixing said first contact surface to said first member at the first interface, then doing said affixing, and removing the force that is deflecting said at least one of the joined members whereby a bending stress is imparted to the spanning portion of the gusset.

25. The process of claim 22 wherein the first contact surface and the area of the first member in contact therewith are of metal that can be welded together, and the affixing of the first contact surface to the first member is done by welding.

26. The process of claim 25 wherein the first and second members and the gusset comprise steel.

27. The process of claim 26 wherein the welding forms a plug weld, the plug weld begin a gas metal are weld, and the gusset has at least one foot.

28. The process of claim 22 wherein the bracket structure is for use in a conveyance.

29. The process of claim 28 wherein the bracket structure is a portion of an air chamber bracket for automotive use, said members and gusset comprising steel, and the gusset being affixed to the arm by welding.

30. The process of claim 29 wherein the welding affixing the gusset to the arm is gas metal arc plug welding.

31. The process of claim 22 wherein there is a guide means for directing reciprocatory motion of the second contact surface at said second interface.

32. The process of claim 31 wherein the members and the gusset comprise steel, and the gusset has at least one foot.

33. The process of claim 22 wherein a friction-increasing material is disposed at the second interface.

* * * * *